(12) United States Patent
Kim et al.

(10) Patent No.: US 7,934,138 B2
(45) Date of Patent: Apr. 26, 2011

(54) LOW DENSITY PARITY CHECK CODE-BASED HYBRID AUTOMATIC REPEAT REQUEST METHOD

(75) Inventors: Dong-Ho Kim, Seoul (KR); Cheol-Woo You, Seoul (KR); Yung-Soo Kim, Seongnam-si (KR); Ye-Hoon Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1094 days.

(21) Appl. No.: 11/703,595

(22) Filed: Feb. 7, 2007

(65) Prior Publication Data

US 2007/0220399 A1  Sep. 20, 2007

(30) Foreign Application Priority Data

Feb. 7, 2006  (KR) .................. 10-2006-0011685

(51) Int. Cl.
*H03M 13/00* (2006.01)
(52) U.S. Cl. ........ 714/751; 714/758; 714/805; 714/807; 714/790
(58) Field of Classification Search .................. 714/748, 714/751, 758, 805, 807, 790
See application file for complete search history.

(56) References Cited

U.S. PATENT DOCUMENTS

| | | | |
|---|---|---|---|
| 7,254,769 B2 * | 8/2007 | Kim et al. | 714/774 |
| 7,421,644 B2 * | 9/2008 | Mantha et al. | 714/800 |
| 7,458,011 B2 * | 11/2008 | Nefedov | 714/800 |
| 7,493,551 B2 * | 2/2009 | Berens et al. | 714/790 |
| 7,502,987 B2 | 3/2009 | Kyung et al. | |
| 7,519,895 B2 | 4/2009 | Kyung et al. | |
| 7,600,173 B2 * | 10/2009 | Matsumoto | 714/755 |
| 7,669,103 B2 * | 2/2010 | Soljanin et al. | 714/751 |
| 7,747,922 B2 * | 6/2010 | Mielczarek et al. | 714/748 |
| 7,783,961 B2 * | 8/2010 | Yue et al. | 714/790 |
| 2005/0149841 A1 | 7/2005 | Kyung et al. | |

FOREIGN PATENT DOCUMENTS

| | | |
|---|---|---|
| KR | 1020050046468 | 5/2005 |
| KR | 1020050046471 | 5/2005 |
| KR | 1020050118056 | 12/2005 |
| KR | 100550414 | 2/2006 |

* cited by examiner

*Primary Examiner* — Esaw T Abraham
(74) *Attorney, Agent, or Firm* — The Farrell Law Firm, P.C.

(57) ABSTRACT

A transmission method based on a Hybrid Automatic Repeat Request (HARQ) scheme for in a communication system. A codeword is generated using a Low Density Parity Check (LDPC) code. Parity bits of the codeword are classified on a basis of a transmission priority. Parity bits with an identical transmission priority are grouped. An information bit group of the codeword and parity bit groups with the identical transmission priority are shuffled in a predefined pattern. A packet is generated from the shuffled information bit group and the shuffled parity bit groups based on the transmission priority. The generated packet is retransmitted in response to a retransmission request. The transmission method can obtain the effect of channel interleaving by setting a transmission priority according to importance of puncturing target blocks, shuffling blocks with the same priority, and shuffling and transmitting bits configuring each block.

14 Claims, 9 Drawing Sheets

LOW DENSITY PARITY CHECK CODE-BASED HYBRID AUTOMATIC REPEAT REQUEST METHOD

PRIORITY

This application claims priority under 35 U.S.C. §119 to an application filed in the Korean Intellectual Property Office on Feb. 7, 2006 and assigned Serial No. 2006-11685, the contents of which are incorporated herein by reference.

BACKGROUND OF THE INVENTION

1. Field of the Invention

The present invention generally relates to a wireless communication system, and more particularly to a Low Density Parity Check (LDPC) code-based Hybrid Automatic Repeat Request (HARQ) method.

2. Description of the Related Art

In a wireless communication system, an Automatic Repeat Request (ARQ) scheme and a Forward Error Correction (FEC) scheme are known as error control algorithms. Recently, various HARQ schemes are being developed as the technology used for controlling errors by combining the ARQ scheme and the FEC scheme.

The simplest HARQ scheme is a Chase Combining (CC) scheme. In the CC-based HARQ scheme, a decoder combines a plurality of received encoded packet copies when the copies of an encoded data packet are transmitted. The CC scheme can provide diversity gain and can be easily implemented.

Another HARQ scheme is an Incremental Redundancy (IR) scheme. When decoding fails at the first attempt, additional redundant information is transmitted in place of a copy of a total encoded packet.

Recently, a large amount of research is being conducted on the CC-HARQ and IR-HARQ based on a LDPC code. Conventionally, it is known that the IR-HARQ outperforms the CC-HARQ.

However, because a performance of the IR-HARQ scheme based on the LDPC is determined by a puncturing algorithm of the LDPC code, the development of an LDPC puncturing algorithm is mandatory, which can minimize performance degradation due to puncturing. Unfortunately, all of the code rates are not supported because an LDPC code puncturing process is performed in a block unit in the conventional IR-HARQ scheme based on the LDPC.

SUMMARY OF THE INVENTION

Accordingly, the present invention has been designed to solve at least the above and other problems occurring in the prior art. Therefore, it is an aspect of the present invention to provide a Low Density Parity Check (LDPC) code-based Hybrid Automatic Repeat Request (HARQ) method that can support various code rates and various modulation levels.

It is another aspect of the present invention to provide a Hybrid Automatic Repeat Request (HARQ) method that can be used with all desired code rates by performing puncturing processes in a block unit and a bit unit for a parity region of a Low Density Parity Check (LDPC) code.

It is yet another aspect of the present invention to provide a Hybrid Automatic Repeat Request (HARQ) method that can obtain the effect of channel interleaving by setting a transmission priority according to importance of puncturing target blocks, shuffling blocks with the same priority, and shuffling transmitting bits that are included each block.

In accordance with an aspect of the present invention, there is provided a transmission method based on a Hybrid Automatic Repeat Request (HARQ) scheme in a communication system that includes generating a codeword using a Low Density Parity Check (LDPC) code; classifying parity bits of the codeword on a basis of a transmission priority, and grouping parity bits with an identical transmission priority; shuffling an information bit group of the codeword and parity bit groups with the identical transmission priority in a predefined pattern; and generating a packet from the shuffled information bit group and the shuffled parity bit groups based at least in part on the transmission priority, and retransmitting the generated packet in response to a retransmission request.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention unclear.

A Low Density Parity Check (LDPC) code-based Hybrid Automatic Repeat Request (HARQ) method in accordance with exemplary embodiments of the present invention will be described in detail herein below with reference to the accompanying drawings. The present invention is applied to a parity check matrix of an LDPC code proposed for an Orthogonal Frequency Division Multiple Access (OFDMA) PHY of Institute of Electrical and Electronics Engineers (IEEE) 802.16e standard.

Now, an LDPC code puncturing method in accordance with an exemplary embodiment of the present invention will be described with reference to the accompanying drawings.

Figures 1, 2:
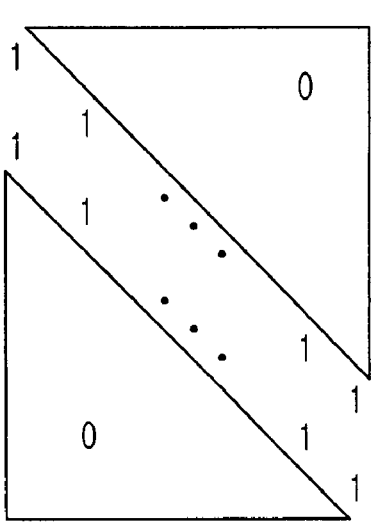
FIG. 1 illustrates a structure of a parity check matrix of a Low Density Parity Check (LDPC) code proposed for an Orthogonal Frequency Division Multiple Access (OFDMA) PHY of Institute of Electrical and Electronics Engineers (IEEE) 802.16e standard.
FIG. 2 illustrates a structure of a parity pattern $H_{b2}$ of the parity check matrix of FIG. 1.

FIG. 1 illustrates a structure of a parity check matrix of an LDPC code proposed for the OFDMA PHY of IEEE 802.16e. In FIG. 1, $P_{i,j}$ is a z×z permutation matrix or a z×z zero matrix. A matrix H is extended from a $m_b \times n_b$ binary base matrix $H_b$, where $n=z \cdot n_b$, $m=z \cdot m_b$, and $z \geq 1$. The base matrix is extended by replacing elements of 1's configuring the base matrix with the z×z permutation matrix, and replacing elements of 0's with the z×z zero matrix.

The base matrix is divided into a pattern $H_{b1}$ mapped to systematic bits and a pattern $H_{b2}$ mapped to parity check bits. $H_b = [(H_{b1})_{m_b \times k_b} : (H_{b2})_{m_b \times m_b}]$. $H_{b2}$ is divided into a vector $h_b$ with a weight 3 and $H'_{b2}$ with a dual-diagonal structure. $H_{b2} = \lfloor h_b : H'_{b2} \rfloor$.

FIG. 2 illustrates a structure of a parity pattern $H_{b2}$ of the parity check matrix of FIG. 1. Except for dual-diagonal elements of $H'_{b2}$, all the remaining elements are 0.

The base matrix includes $h_b(0)=1$, $h_b(m_b-1)=1$, and $h_b(j)=1 (0<j<(m_b-1))$.

Figure 3:
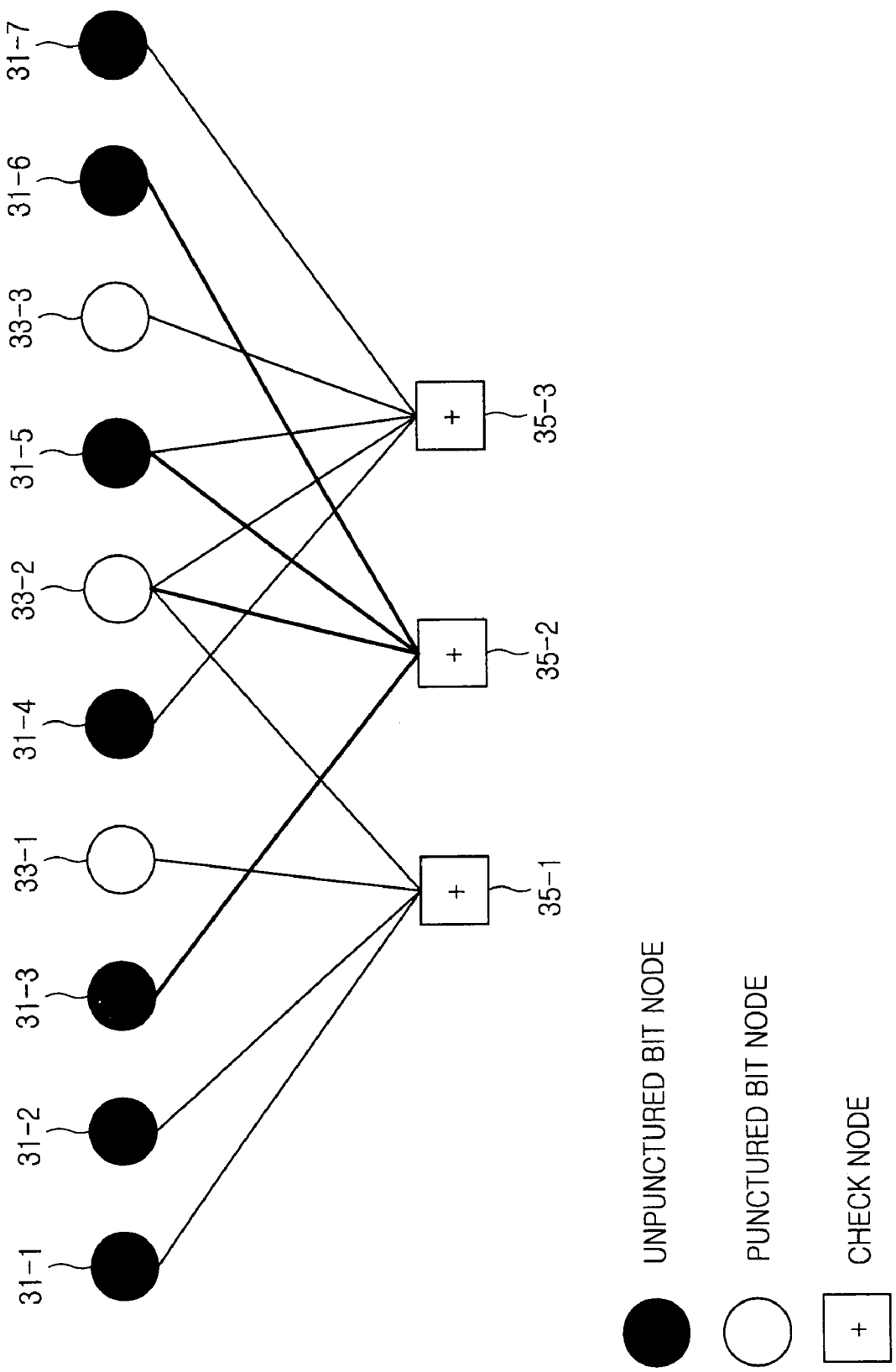
FIG. 3 is an exemplary factor graph illustrating the terminology defined in a puncturing method of the present invention.

FIG. 3 is an exemplary factor graph illustrating the terminology defined in a puncturing method of the present invention.

In FIG. 3, unpunctured bit nodes 31-1~31-7 are referred to as 0-Step Recoverable (0-SR) nodes. When at least one Survived Check (SC) node of neighboring check nodes 35-1~35-3 (connected to an edge) is a check node 35-2 connected to only the 0-SR bit nodes 31-1~31-7 except its own punctured bit node, a punctured bit node 33-2 is referred to as a 1-SR node. When a Binary Erasure Channel (BEC) is considered, the 1-SR node is a node recoverable through one decoding process at the time of iterative decoding.

When step-by-step recoverable nodes are generalized and defined, a punctured bit node connected to at least one SC node that is connected to at least one (k−1)-SR node and m-SR nodes ($0 \leq m \leq k-1$) is a k-SR node.

Figure 4:
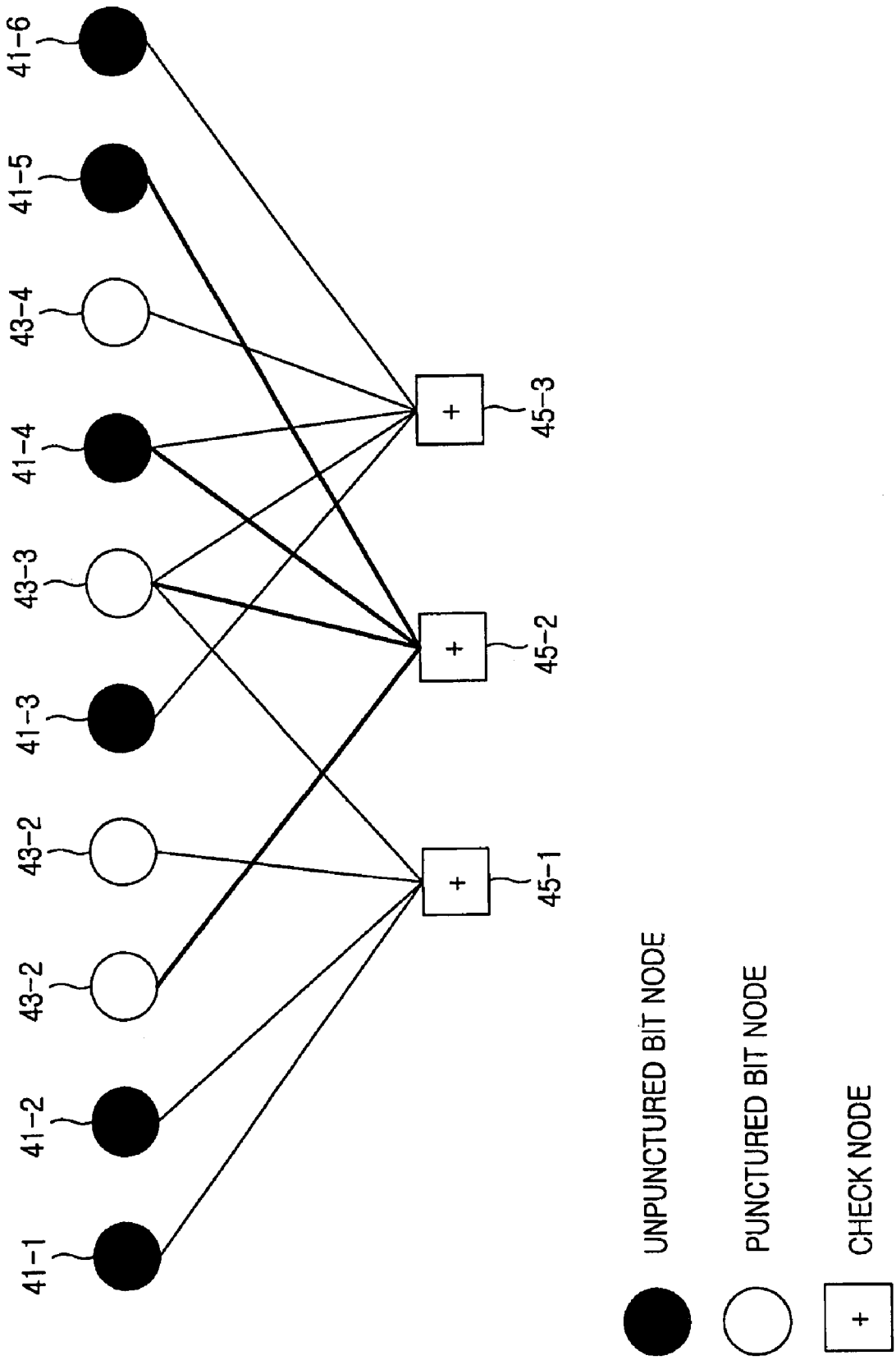
FIG. 4 is a factor graph illustrating a k-Step Recoverable (k-SR) node.

FIG. 4 illustrates an example of the k-SR node. Bit nodes 41-1~41-6 are 0-SR nodes or bit nodes recovered up to the (k−1) steps. A punctured bit node 43-3 connected to an SC node 45-2 that is connected to at least one (k−1)-SR node 43-2 and m-SR nodes 41-4 and 41-5 among check nodes 45-1~45-3 is a k-SR node. When a BEC is considered, the k-SR node is a node recoverable through k decoding processes at the time of iterative decoding.

Figure 5:
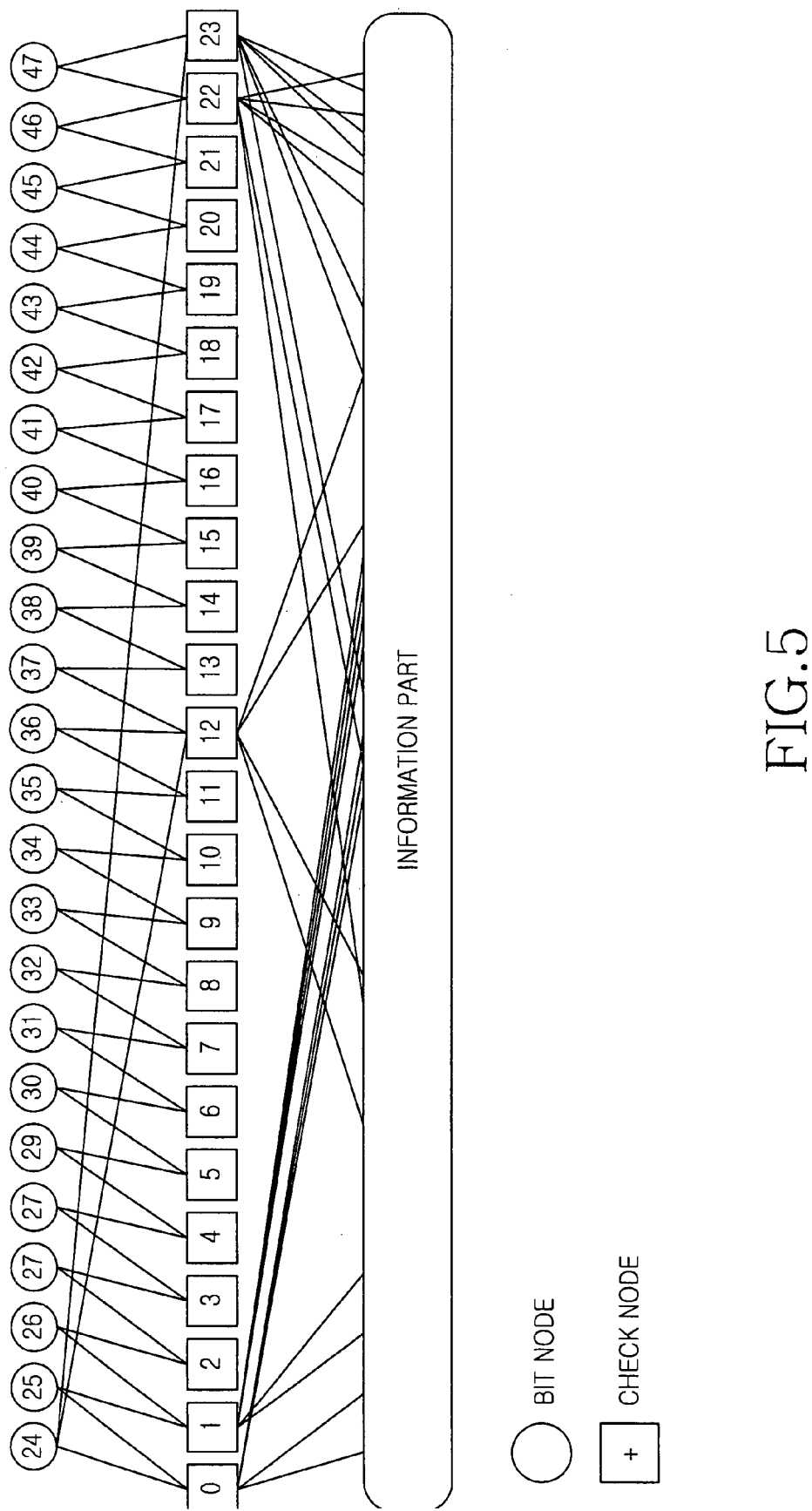
FIG. 5 is a factor graph illustrating the $H_{b2}$ pattern of FIG. 2.

FIG. 5 is a factor graph illustrating the $H_{b2}$ pattern of FIG. 2. It can be seen that bit nodes and check nodes on the factor graph are connected in an almost zigzag pattern. Specifically, it can be seen that a first column configuring a first parity pattern is connected to three check nodes.

Figure 6:
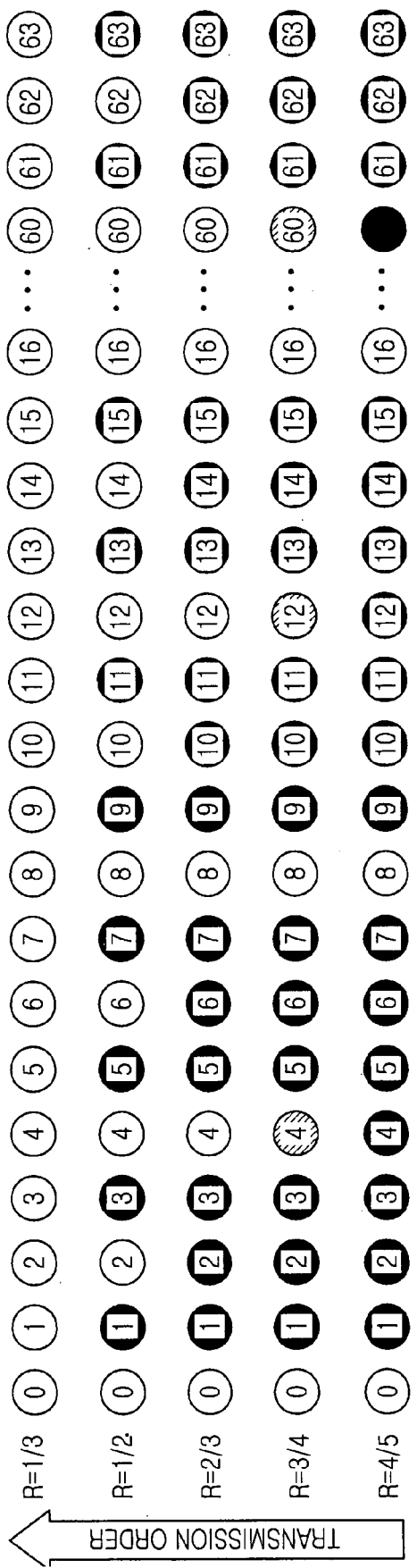
FIG. 6 illustrates a puncturing pattern according to a code rate of a parity region of a parity check matrix including 64 parity blocks at a code rate ⅓.

FIG. 6 illustrates a puncturing pattern according to a code rate of a parity region of a parity check matrix including 64 parity blocks at a code rate ⅓.

As illustrated in FIG. 6, one bit node block connected to all check node blocks can be punctured in order to obtain a code rate ½. In other words, when $1^{st}$, $3^{rd}$, $5^{th}$, $7^{th}$, ..., $61^{st}$, and $63^{rd}$ block columns of the parity part are punctured, the code rate ½ is obtained because 32 block columns are punctured. A code rate ⅔ can be obtained because 16 block columns are additionally punctured when even block columns placed between the block columns punctured in the puncturing pattern based on the code rate ½ of the parity part are alternately punctured. A code with a code rate ¾ can be obtained when a puncturing process in a bit unit is performed for some unpunctured blocks in addition to the puncturing pattern based on the code rate ⅔. A code with a code rate ⅘ can be obtained when a puncturing process in a block unit is performed for partially punctured blocks in addition to the puncturing pattern based on the code rate ¾.

If a puncturing pattern is set according to a code rate, parity bits to be first transmitted can be set at the time of retransmission based on an HARQ scheme. In an Incremental Redundancy (IR)-HARQ scheme, a data transmission is started at a high code rate. If a channel state is bad (i.e. less than a threshold level), the code rate is gradually lowered. In other words, an initial transmission is attempted at a code rate r (=⅘). When error occurs, the code rate is gradually lowered to r=¾, r=⅔, r=½, and r=⅓.

In an exemplary embodiment of the present invention, parity bits to be first transmitted in the initial transmission are classified according to degree of affecting performance degradation. A node affecting importance of a neighboring parity node according to puncturing is defined as a kernel node.

Figure 7:
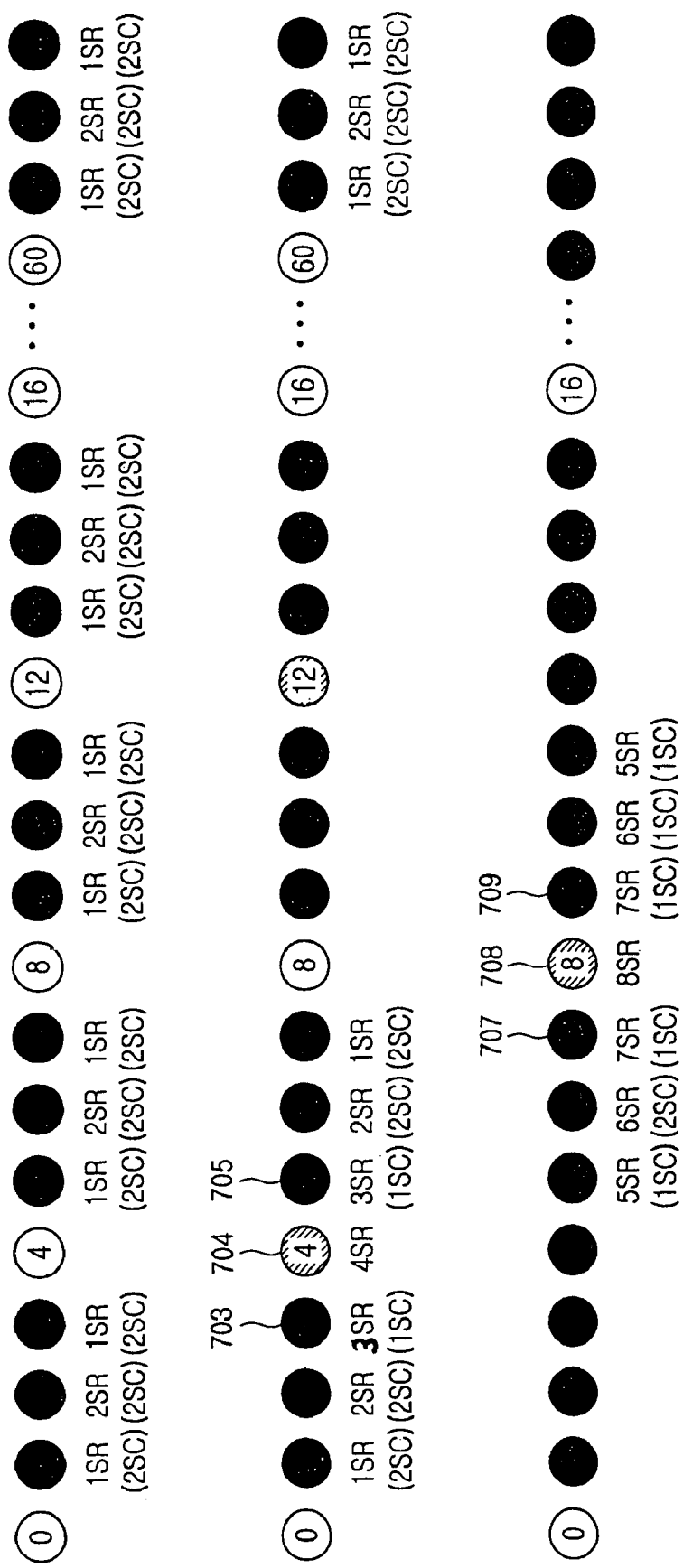
FIG. 7 illustrates a kernel node in a Hybrid Automatic Repeat Request (HARQ) method in accordance with the present invention.

FIG. 7 illustrates a kernel node in an HARQ method in accordance with the present invention.

As illustrated in FIG. 7, an associated node becomes a 4-SR node when a $4^{th}$ parity node 704 is punctured. Neighboring parity nodes 703 and 705 are changed from 1-SR nodes to 3-SR nodes. When an $8^{th}$ parity node 708 is further punctured, the associated node becomes an 8-SR node and neighboring parity nodes 707 and 709 become 7-SR nodes. When a transmission priority of a kernel node is set in the above-described method, kernel nodes are grouped on a priority-by-priority basis using a buffer.

Figure 8:
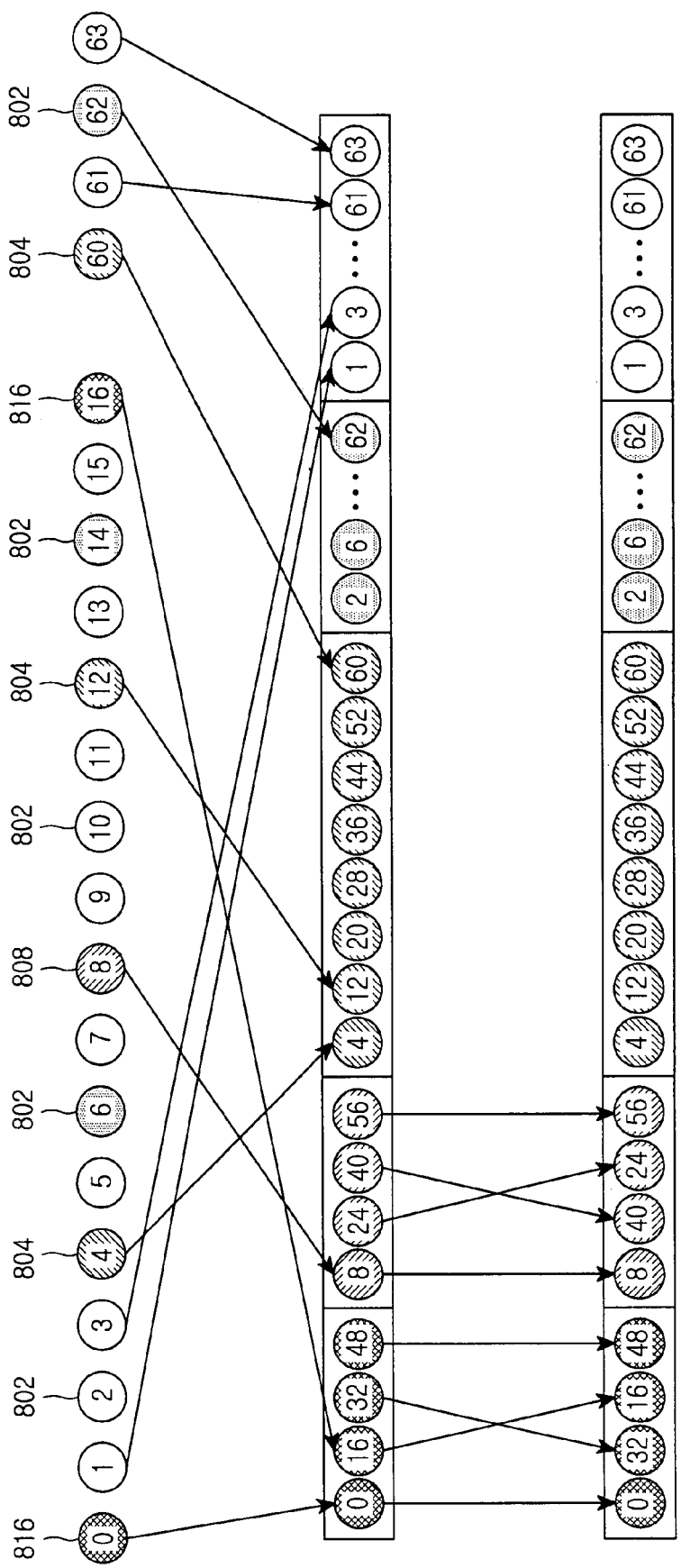
FIG. 8 illustrates a block shuffling process for parity nodes to be transmitted in the HARQ method in accordance with the present invention.

FIG. 8 illustrates a block shuffling process for parity nodes to be transmitted in the HARQ method in accordance with the present invention. As described above, the kernel nodes configuring groups classified on the priority-by-priority basis are shuffled in a predefined pattern. To obtain a required code rate, each kernel node can be punctured in a bit unit. Bits configuring the kernel node are shuffled in a predefined pattern.

In FIG. 8, nodes with the highest transmission priority are $0^{th}$, $16^{th}$, $32^{nd}$, and $48^{th}$ nodes 801 and 816, and can be expressed by $B_{k1}(n)=16n$ where n=0, 1, 2, 3. Nodes with the second highest priority are $8^{th}$, $24^{th}$, $40^{th}$, and $56^{th}$ parity nodes, and are expressed by $B_{k2}(n)=16n+8$ where n=0, 1, 2, 3. Nodes with the third highest priority are $4^{th}$, $12^{th}$, $20^{th}$, $28^{th}$, $36^{th}$, $44^{th}$, $52^{nd}$, and $60^{th}$ parity nodes, and are expressed by $B_{k3}(n)=8n+4$ where n=0, 1, 2, 3, ..., 7. Similarly, nodes with the fourth highest priority can be expressed by $B_{k4}(n)=4n+2$ where n=0, 1, 2, 3, ..., 15. Nodes with the fifth highest priority can be expressed by $B_{k5}(n)=2n+1$ where n=0, 1, 2, 3, ..., 31.

Accordingly, when buffers are full on a transmission priority-by-transmission priority basis, nodes with the same priority are shuffled in a predefined pattern. For example, as illustrated in FIG. 8, an order of $0^{th}$, $16^{th}$, $32^{nd}$, and $48^{th}$ nodes 816 with the first priority is changed to that of $0^{th}$, $32^{nd}$, $16^{th}$, and $48^{th}$ nodes.

In the HARQ method in accordance with the present invention, a bit shuffling process is performed for bit nodes configuring kernel nodes with the same transmission priority along with a block shuffling process.

Figure 9A:
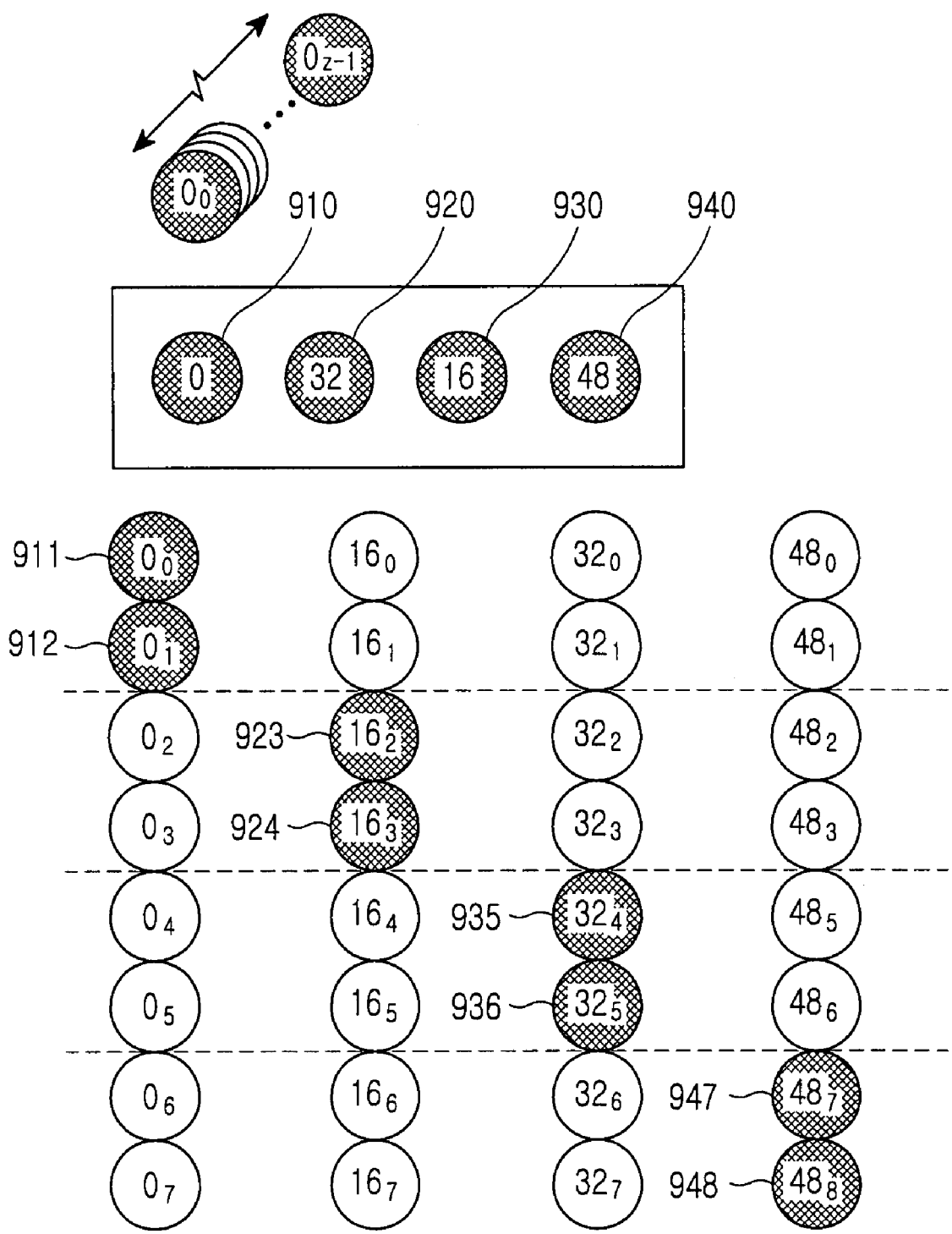
FIGS. 9A and 9B illustrate a bit shuffling process in the HARQ method in accordance with the present invention.
Figure 9B:
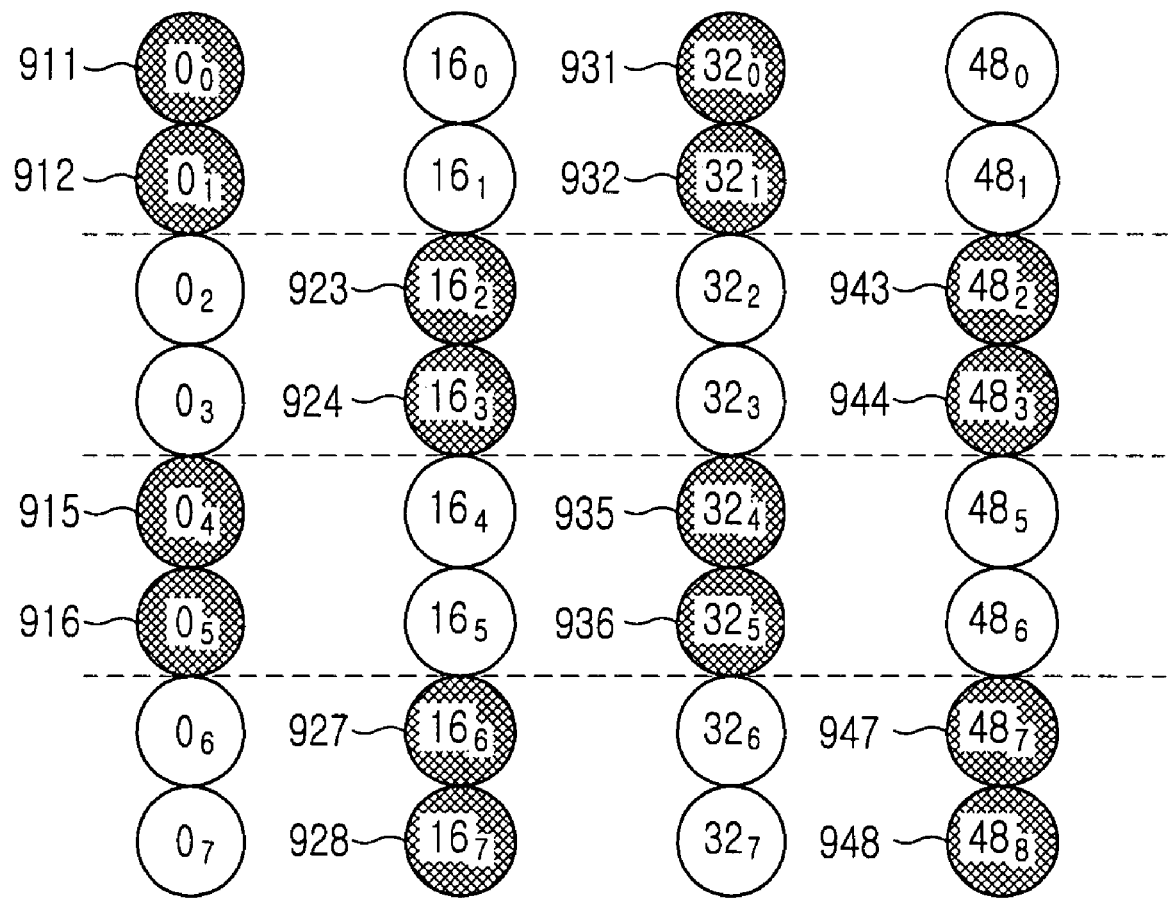

FIGS. 9A and 9B illustrate a bit shuffling process in the HARQ method in accordance with the present invention. The bit shuffling process is performed while considering an edge connection state of bit nodes configuring kernel nodes with the same priority.

In FIG. 9A, the number of bits configuring the kernel node, z, is 8. When a partial puncturing process is applied, a same number of bit nodes are uniformly transmitted from the kernel nodes, and bits are transmitted in different bit positions.

In other words, when $0^{th}$, $16^{th}$, $32^{nd}$, and $48^{th}$ kernel nodes 910, 920, 930, and 940 with the same priority are partially punctured and transmitted, $0^{th}$ and $1^{st}$ bits 911 and 912 of the $0^{th}$ kernel node are transmitted, $2^{nd}$ and $3^{rd}$ bits 923 and 924 of the $16^{th}$ kernel node are transmitted, $4^{th}$ and $5^{th}$ bits 935 and 936 of the $32^{nd}$ kernel node are transmitted, and $6^{th}$ and $7^{th}$ bits 947 and 948 of the $48^{th}$ kernel node are transmitted.

On the other hand, when the number of bits to be transmitted in the same kernel node increases and 4 bits per node are transmitted as illustrated in FIG. 9B, $0^{th}$, $1^{st}$, $4^{th}$, and $5^{th}$ bits 911, 912, 915, and 916 of the $0^{th}$ kernel node are transmitted, $2^{nd}$, $3^{rd}$, $6^{th}$, and $7^{th}$ bits 923, 924, 927, and 928 of the $16^{th}$ kernel node are transmitted, $0^{th}$, $1^{st}$, $4^{th}$, and $5^{th}$ bits 931, 932, 935, and 936 of the $32^{nd}$ kernel node are transmitted, and $2^{nd}$, $3^{rd}$, $6^{th}$, and $7^{th}$ bits 943, 944, 947, and 948 of the $48^{th}$ kernel node are transmitted.

As is apparent from the above description, a transmission method of the present invention can obtain all desired code rates by performing puncturing processes in both a block unit and a bit unit for a parity region of an LDPC code, and can be applied to various retransmission schemes such as full Incremental Redundancy (IR), partial IR, chase combining, and so on.

Moreover, the transmission method of the present invention can obtain the effect of channel interleaving by setting a transmission priority according to importance of puncturing target blocks and shuffling and transmitting blocks with the same priority.

Moreover, the transmission method of the present invention can further improve the channel interleaving effect by shuffling and transmitting bits configuring a partially punctured block.

Although the exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A transmission method based on a Hybrid Automatic Repeat Request (HARQ) scheme in a communication system, comprising:
   generating a codeword using a Low Density Parity Check (LDPC) code;
   classifying parity bits of the codeword on a basis of a transmission priority and grouping parity bits with an identical transmission priority;
   shuffling an information bit group of the codeword and parity bit groups with the identical transmission priority in a predefined pattern;
   generating a packet from the shuffled information bit group and the shuffled parity bit groups based on the transmission priority;
   storing the packet in one of a serial and a circular transmission buffer;
   setting parity bits and information bits to be transmitted according to a transmission code rate; and
   retransmitting the generated packet in response to a retransmission request.

2. The method of claim 1, wherein the transmission priority increases as a degree of affecting performance degradation increases at a puncturing time.

3. The method of claim 1, wherein the shuffling step comprises:
   combining and shuffling a plurality of parity groups with different transmission priorities.

4. The method of claim 3, wherein the shuffling step further comprises:
   setting a shuffling pattern based on a mutual edge connection relation of bits configuring each group.

5. A transmission method based on a Hybrid Automatic Repeat Request (HARQ) scheme in a communication system, comprising:
   generating a codeword block using a block Low Density Parity Check (LDPC) code;
   classifying parity blocks of the codeword block on a basis of a transmission priority and grouping parity blocks with an identical transmission priority;
   shuffling an information bit block group of the codeword block and parity block groups with the identical transmission priority in a block unit in a predefined pattern;
   shuffling bits in each block in a bit unit in a predefined pattern;
   generating a packet from a shuffled information bit block and shuffled parity blocks based on the transmission priority;
   storing the packet in one of a serial and a circular transmission buffer;
   setting parity bits and information bits to be transmitted according to a transmission code rate; and
   retransmitting the generated packet in response to a retransmission request.

6. The transmission method of claim 5, wherein the transmission priority increases as a degree of affecting performance degradation increases at a puncturing time.

7. The transmission method of claim 6, wherein parity blocks with a highest priority are $16n^{th}$ (n=0, 1, 2, 3) blocks among the parity blocks.

8. The transmission method of claim 6, wherein parity blocks with a second highest priority are $(16n+8)^{th}$ (n=0, 1, 2, 3) block among the parity blocks.

9. The transmission method of claim 6, wherein parity blocks with a third highest priority are $(8n+4)^{th}$ (n=0, 1, 2, 3, ..., 7) blocks among the parity blocks.

10. The transmission method of claim 6, wherein parity blocks with a fourth highest priority are $(4n+2)^{th}$ (n=0, 1, 2, 3, ..., 15) blocks among the parity blocks.

11. The transmission method of claim 6, wherein parity blocks with a fifth highest priority are $(2n+1)^{th}$ (n=0, 1, 2, 3, ..., 31) blocks among the parity blocks.

12. The transmission method of claim 6, wherein priorities of the parity blocks are lowered in order of $16n^{th}$ (n=0, 1, 2, 3), $(16n+8)^{th}$ (n=0, 1, 2, 3), $(8n+4)^{th}$ (n=0, 1, 2, 3, ..., 7), $(4n+2)^{th}$ (n=0, 1, 2, 3, ..., 15), and $(2n+1)^{th}$ (n=0, 1, 2, 3, ..., 31) parity blocks.

13. The transmission method of claim 5, wherein the step of shuffling the parity blocks comprises:
   combining and shuffling a plurality of parity block groups with different transmission priorities.

14. The transmission method of claim 5, wherein the shuffling step further comprises:
   setting a shuffling pattern based on a mutual edge connection relation of bits configuring blocks of each group.

* * * * *